Patented Feb. 28, 1928.

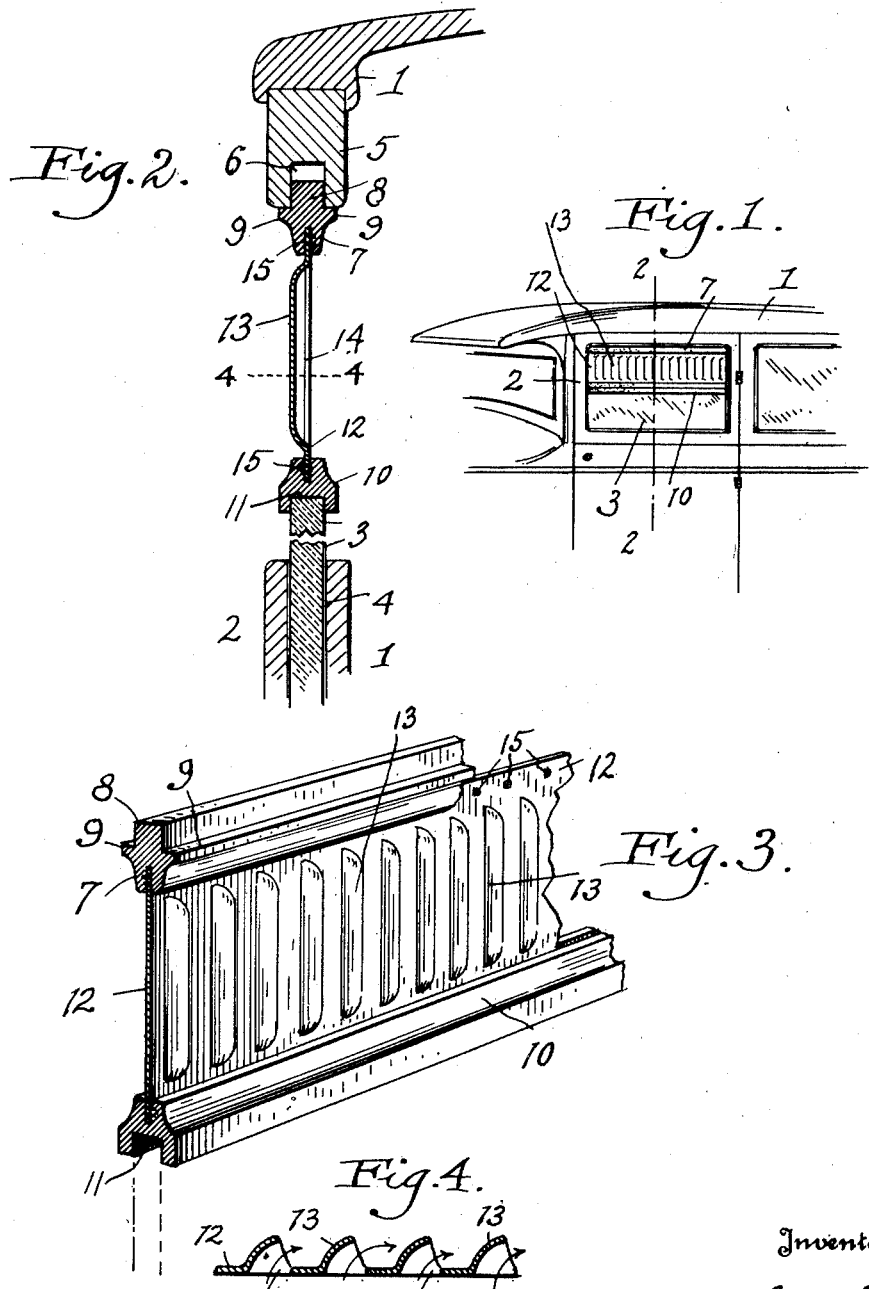

1,660,893

UNITED STATES PATENT OFFICE.

JOHN O. SMITH, OF CLEVELAND, OHIO, ASSIGNOR OF ONE-HALF TO LEO K. WOODMAN.

VENTILATOR FOR CLOSED CARS.

Application filed June 8, 1926. Serial No. 114,430.

This invention relates to a ventilator for closed cars which is adapted to be placed in a window opening between the upper edge of the sliding window and the top of the window-frame. The invention has for an object to provide a ventilator which can be quickly and easily inserted in a window opening between the upper edge of the sliding window and the top of the window-frame.

The invention has for an object to provide a ventilator which can be quickly and easily inserted in a window opening and which will cut off objectionable drafts from the outside and at the same time effectively ventilate the car.

A further object is to provide a ventilator which is simple in construction, which is of light weight, which is durable, and which can be manufactured at a low cost.

With the above and other objects in view the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 1 is a side elevation showing a car body window with the ventilator in place therein;

Fig. 2 is a vertical section on the line 2—2 of Fig. 1;

Fig. 3 is a perspective view of the ventilator;

Fig. 4 is a fragmentary section taken on the line 4—4 of Fig. 2.

In the accompanying drawings the car body is indicated by the numeral 1, the window-frame by the numeral 2 and the sliding window-pane by the numeral 3. The window-pane is mounted to slide vertically in the frame and downwardly into a recess 4 in the wall of the car body below the window opening, the top member 5 of the frame having a groove 6 to receive the upper edge of the window-pane when the pane is in its uppermost or closed position.

The present invention consists of a ventilator attachment which is adapted to fit in the window opening between the upper edge of the window-pane 3 and the top member 5 of the window-frame. The ventilator has a top bar 7 which fits between the side members of the window-frame in engagement with the top member 5 thereof, and this top bar 7 has an upper edge portion 8 which fits within the pane receiving groove 6 and side flanges 9 which engage with the lower edge of the top member 5 at the opposite sides of the groove. The ventilator is also provided with a lower bar 10 which fits between the side members of the window-frame and has a channel 11 along the underside thereof in which the upper edge of the window-pane 3 is adapted to fit. The upper and lower bars 7 and 10 are preferably formed of rubber and carry between them a sheet metal panel 12, the upper and lower edges of which are embedded in the bars 7 and 10. The rubber bars are adapted to yield sufficiently to conform to and closely hug the edges of the window-pane and top frame member so that the ventilator can be tightly held between the window-pane and the top of the window-frame and will not be caused to rattle by vibrations in the vehicle body. Intermediate the edges thereof the sheet metal panel 12 has a series of vertically disposed louvers 13 struck up therefrom providing elongated openings 14 in the panel, the louvers projecting outwardly from the body of the panel and overlying the openings. The edge portions of the panel 12 embedded in the rubber bars are provided on the opposite sides thereof with short integral projections 15 formed by metal pushed out around holes punched in a row along said edges, the holes being punched alternately from opposite sides of the panel to provide projections on opposite sides thereof.

To put the ventilator in place in the window opening the window-pane 3 is lowered sufficiently to permit the top bar 7 of the ventilator to be placed in the groove 6 of the top member of the window-frame and the pane is then raised into engagement with the channel 11 of the lower bar 10 clamping the ventilator between the upper edge of the window-pane 3 and the top member 5 of the frame. The ventilator is placed in the window opening with the louvers 13 upon the outer side thereof and inclined toward the rear end of the car. When the car is in motion there will be a strong current of air over the rearwardly inclined louvers which will create a suction through the openings 14 to draw air from the interior of the car, the ventilator creating a flow of air from the interior of the car and preventing drafts through the window opening into the interior thereof.

The rubber top and bottom bars 7 and 10 of the ventilator and also the sheet metal strips from which the panels 12 are formed, can be manufactured in strips of any desired length and cut to the lengths required for various window openings and, furthermore, the louvers can be readily punched in the sheet metal strips by an automatic punch press.

It will be apparent, therefore, that this ventilator can be manufactured at a very low cost, that the suction through the openings in the panels caused by the rearwardly inclined louvers overlying the openings will prevent drafts through the window opening and will effectively ventilate the car, and that the small panel entirely within the confines of the window-frame is neat and attractive in appearance.

Having thus described my invention, I claim:

1. A ventilator for closed car bodies adapted to be inserted between the upper edge of a vertically sliding window and the top member of the window frame and comprising a panel formed of a strip of sheet metal, said panel having elongated openings extending substantially from the top to the bottom thereof and integral louvers pressed outwardly from the body of the strip and overlying the openings, and bars permanently secured to the upper and lower edges of the panel, the upper bar being formed to fit in the window receiving groove of the top member of the window frame and the lower of said bars having a channel to receive the upper edge of the window.

2. A ventilator for closed car bodies adapted to be inserted between the upper edge of a vertically sliding window and the top member of the window-frame and comprising an upper bar adapted to engage the top member of the window-frame, said bar having an upper edge portion adapted to fit in the window receiving groove of the top frame member and flanges adapted to engage the frame member on opposite sides of the groove, a lower bar having a channel on the under side thereof adapted to receive the upper edge of the window, and a sheet metal panel between the upper and lower bars, said panel having openings and louvers overlying said openings.

3. The combination with a window of a closed car body having a frame and a vertically sliding window, of a ventilator comprising upper and lower bars formed of rubber and adapted to engage the top member of the window frame and the upper edge of window, the upper of said bars being adapted to fit in the window receiving groove of the top member of the window frame and the lower bar having a channel to receive the upper edge of the window, and a sheet metal panel having its upper and lower edges embedded in said bars and anchored therein, said sheet metal panel having outwardly and rearwardly projecting louvers struck up from the body thereof to provide ventilating openings.

In testimony whereof, I hereunto affix my signature.

JOHN O. SMITH.